United States Patent
Hornik et al.

(10) Patent No.: US 9,995,422 B2
(45) Date of Patent: Jun. 12, 2018

(54) ABSORBING DEVICE AND METHOD FOR ITS PRODUCTION

(71) Applicant: Hanon Systems, Daejeon (KR)

(72) Inventors: Tomas Hornik, Novy Jicin (CZ); Petr Czyz, Hodslavice (CZ); Zdenek Vahalik, Komenskeho (CZ)

(73) Assignee: HANON SYSTEMS, Daejeon (KR)

( * ) Notice: Subject to any disclaimer, the term of this patent is extended or adjusted under 35 U.S.C. 154(b) by 0 days. days.

(21) Appl. No.: 14/907,041

(22) PCT Filed: Apr. 7, 2015

(86) PCT No.: PCT/KR2015/003482
§ 371 (c)(1),
(2) Date: Jan. 22, 2016

(87) PCT Pub. No.: WO2015/156585
PCT Pub. Date: Oct. 15, 2015

(65) Prior Publication Data
US 2017/0248264 A1    Aug. 31, 2017

(51) Int. Cl.
*F16L 55/04* (2006.01)
*F16L 55/02* (2006.01)
(Continued)

(52) U.S. Cl.
CPC ............ *F16L 55/02* (2013.01); *F25B 41/003* (2013.01); *B60H 1/00571* (2013.01); *F25B 2500/07* (2013.01); *F25B 2500/13* (2013.01)

(58) Field of Classification Search
CPC ....... F16L 55/053; F16L 55/054; F16L 55/04; F16L 55/02; F16L 55/09; F16L 55/10;
(Continued)

(56) References Cited

U.S. PATENT DOCUMENTS 3,061,039 A * 10/1962 Peters ..................... F16L 55/02
138/121
3,785,167 A * 1/1974 Sahs ..................... F25D 23/006
417/312
(Continued)

FOREIGN PATENT DOCUMENTS

JP       2011012869 A    1/2011
KR     20000060144 A    10/2000
(Continued)

OTHER PUBLICATIONS

Korean Intellectual Property Office, Machine Translation of KR 2007-0115039.*

*Primary Examiner* — Charles P Cheyney
(74) *Attorney, Agent, or Firm* — Shumaker, Loop & Kendrick, LLP; James D. Miller

(57) ABSTRACT

The absorbing device includes a hollow enclosed chamber including two pot parts. Open ends of the pot parts are connectable to each other by welding or soldering. Each of the pot parts is integrally formed in an opposing end of an air-conditioning conduit, wherein open ends of the pot parts are oriented toward each other. Each of the pot parts is provided with a reduced passage opening interconnected with an internal space of the air-conditioning conduit via a tapered section.

10 Claims, 3 Drawing Sheets

(51) Int. Cl.
*F25B 41/00* (2006.01)
*B60H 1/00* (2006.01)

(58) Field of Classification Search
CPC ... F16L 55/045; F25B 41/003; F25B 2500/07; F25B 2500/13; B60H 1/00571
USPC .................................. 138/26–30, 42, 44
See application file for complete search history.

(56) References Cited

U.S. PATENT DOCUMENTS

| | | | | |
|---|---|---|---|---|
| 4,421,345 A | * | 12/1983 | Ayers | F16L 27/10 285/223 |
| 4,628,704 A | * | 12/1986 | Kilby | B60H 1/3204 29/523 |
| 5,507,159 A | * | 4/1996 | Cooksey | F04B 39/0055 417/312 |
| 5,545,860 A | * | 8/1996 | Wilkes | B60H 1/00507 181/255 |
| 5,955,707 A | * | 9/1999 | Fritz | B60H 1/3229 181/255 |
| 6,672,337 B2 | * | 1/2004 | Kobayashi | F16L 55/045 137/207 |
| 7,987,690 B2 | * | 8/2011 | Duggan | B21J 5/08 72/370.03 |
| 9,243,543 B2 | * | 1/2016 | Bertrand | F01N 13/08 |
| 2003/0155026 A1 | * | 8/2003 | Michlin | F16L 55/04 138/26 |
| 2009/0090579 A1 | * | 4/2009 | Nishida | F04B 53/001 181/255 |
| 2013/0255813 A1 | * | 10/2013 | Auclair | F16L 55/033 138/26 |

FOREIGN PATENT DOCUMENTS

| | | |
|---|---|---|
| KR | 20070096393 A | 10/2007 |
| KR | 20070115039 A | 12/2007 |
| KR | 20110034847 A | 4/2011 |

\* cited by examiner

ABSORBING DEVICE AND METHOD FOR ITS PRODUCTION

CROSS-REFERENCE TO RELATED APPLICATIONS

This patent application is a United States national phase patent application based on PCT patent application number PCT/KR2015/003482 filed Apr. 7, 2015, which claims the benefit of Czech Republic Patent Application No. PV2014-244 dated Apr. 10, 2014. The disclosures of the above patent applications are hereby incorporated herein by reference in their entirety.

TECHNICAL FIELD

Presently known and used absorbing devices for the reduction of pressure pulses caused by a compressor in an air-conditioning conduit of an air-conditioning system consist of a hollow enclosed body having mostly a cylinder shape, which is integrated between two ends of the air-conditioning conduit oriented toward each other.

BACKGROUND ART

The absorbing measure of such device is given by so called expansion rate. The expansion rate is defined as a ratio of the chamber internal diameter to the internal diameter of an inlet duct and/or an outlet duct.

An exemplary embodiment of the absorbing device can be found in the U.S. Pat. No. 4,122,914, wherein an inlet tube leads into an internal space of an absorbing element, while a respective end of the inlet tube is tapered in the shape of an elongated nozzle and perforations are made before the tapered elongation. An outlet tube extends into the internal space of the absorbing element in such manner that parts of both tubes are parallel and are supported by partitions.

Another exemplary embodiment presents a construction design of an absorbing device described in the document JP 1986-184808 that presents a simpler construction solution, wherein both an inlet duct and an outlet duct lead into a chamber internal space, while an internal diameter of the inlet duct and the outlet duct in the absorbing chamber is first reduced and then enlarged.

DISCLOSURE

Technical Problem

A disadvantage of the prior art is, on one hand, a more complicated internal arrangement of the absorbing element and, on the other hand, a necessity of an expensive fabrication of another separate part of the air-conditioning system.

Technical Solution

The above mentioned disadvantages are eliminated with a provision of an absorbing device according to the presented invention. The absorbing device comprises a hollow, enclosed chamber integrated through an inlet end and an outlet end between two opposing ends of an air-conditioning conduit. The substance of the disclosure is characterized by the fact that the hollow, enclosed chamber consists of two pot parts connectable to each other with their open ends, while each of the pot parts is integrally formed with a respective one of the opposing ends of the air-conditioning conduit, and is provided with a reduced passage opening interconnected with an internal space of the air-conditioning conduit, respectively.

The substance of this construction solution of the absorbing device is also characterized by the fact that the reduced passage opening is interconnected with the internal space of the air-conditioning conduit through a tapered transitional section, while open ends of the pot parts are mutually connected to each other by welding or soldering. In this way, the expansion rate, as well as a performance of the absorbing element are maintained at concurrent reduction of both internal and external diameters of the absorbing element.

In case of a high absorbing performance requirement, it is also possible to use an absorbing device according to a second variant of the invention that comprises a hollow, enclosed chamber integrated through an inlet end and an outlet end between two opposing ends of an air-conditioning conduit, the substance of which is characterized by the fact that each of the ends of the air-conditioning conduit is provided with a coaxial mouthpiece for the purpose of securing the respective end in the inlet opening or the outlet opening of the hollow enclosed chamber. The diameter of the mouthpiece is smaller than internal diameters of the ends of the air-conditioning conduit. In this way, the expansion rate is increased, while the same internal diameter of the absorbing element is still retained. As a result its performance increases substantially.

As essential for the absorbing device according to the first variant it is therefore necessary to consider a method for its production, as well. At each end of the air-conditioning conduit, a reduction of the internal diameter of the conduit is performed by ramming, and a thickness of the wall of the conduit also increases to provide a sufficient amount of material for subsequent forming operations. In subsequent steps the end of the conduit is widened up to a final diameter. At the same time, a calibrating of the shape of pot parts, as well as a reducing of the internal diameter of the conduit are performed. In the case of a pot part having a peripheral edge flange also, in another step, a peripherally fitted flange for the connection with the adjacent pot part of the absorbing element is formed.

Advantageous Effects

An advantage of construction according to the first variant of the invention is especially based on the fact that the enclosed chamber generally has a smaller diameter due to the proposed reduction of the diameter of the inlet end and the outlet end of the air-conditioning conduit. By reduction of diameters of the mouthpiece and absorbing device at keeping the same expansion rate, the original efficiency is achieved. Moreover, the optimized geometry of the inlet/outlet reduction of the mouthpiece does not increase the loss of pressure of this component considerably. Accordingly it does not decrease the total efficiency of the air-conditioning system significantly.

DESCRIPTION OF DRAWINGS

Examples of embodiments of the absorbing device according to the invention for reducing pressure pulses caused by a compressor in an air-conditioning conduit of an air-conditioning system are illustrated in accompanying drawings, in which.

DESCRIPTION OF EMBODIMENT OF THE INVENTION

Best Mode

Figure 1:
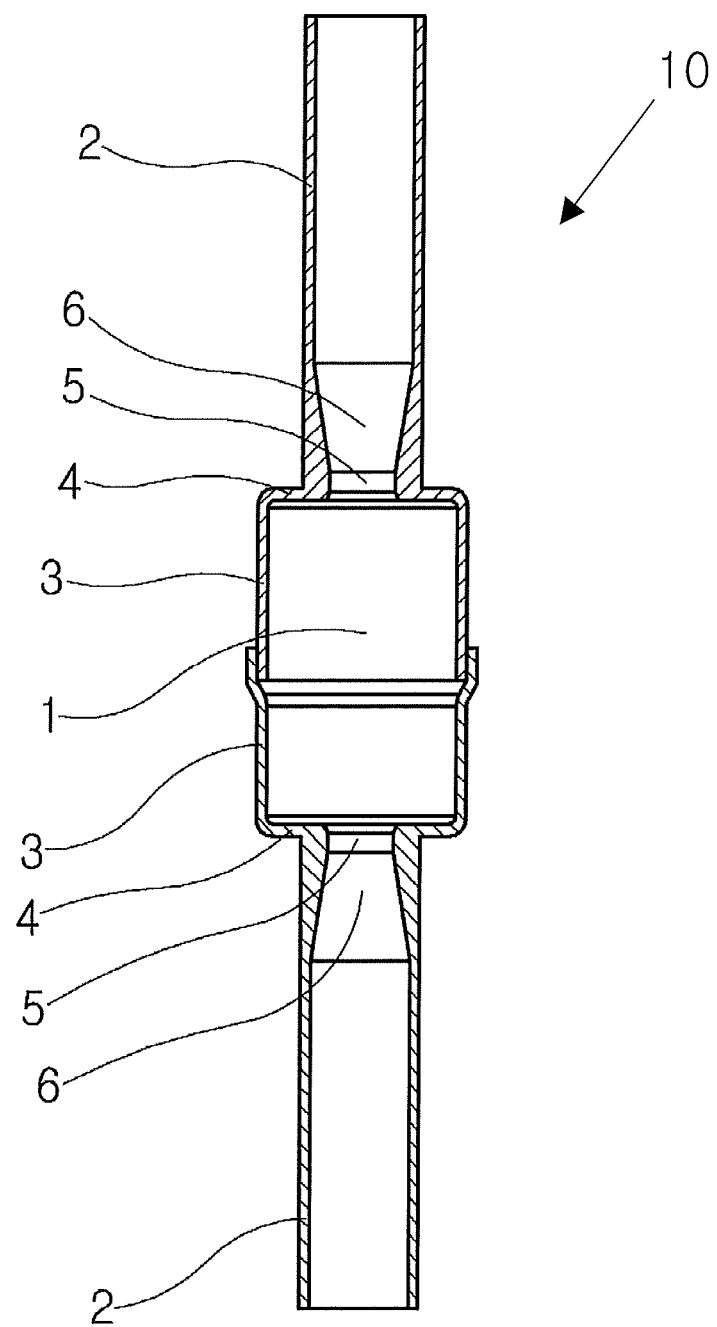
FIG. 1 is a longitudinal, axial cross-sectional view of a first variant of the absorbing device.

As it can be seen in the FIG. 1 the absorbing device 10 includes a hollow, enclosed chamber 1, which comprises two pot parts 3. Open ends of the pot parts 3 are connectable to each other. Each of the pot parts 3 is integrally formed in one of two opposing ends of an air-conditioning conduit 2. Each of the pot parts 3 includes a bottom 4 integrally formed therein. The bottom 4 of each of the pot parts 3 is provided with a passage 5 formed therein. The passage 5 of each of the pot parts 3 is interconnected with an internal space of the respective end of the air-conditioning conduit 2 via a gradually tapered section 6. From the above, it is obvious, as can be seen in FIG. 4, that internal diameter D2 of the air-conditioning conduit 2 is larger than a diameter D5 of the passages 5 of the pot parts 3.

The pot parts 3 are mutually attached to each other via their open ends by welding or soldering.

At each end of the air-conditioning conduits 2, a reduction of the internal diameter of the conduits 2 is performed by ramming. A thickness of a wall of the ends of the conduit 2 is also increased to provide a sufficient amount of material for subsequent forming operations, while an original outer diameter of the conduit 2 is still retained. During further operations, the ends of the conduit 2 are gradually widened up to a final diameter of the pot parts 3 in several steps. In parallel with these operations, a calibrating of the shape of the pot parts, as well as the tapering of an internal diameter of the conduit are performed. In another step, a peripherally fitted flange is formed at the open end of a first one of the pot parts 3. The peripheral edge flange is configured to receive the straight, open end of a second one of the pot parts 3 therein. The connection between the peripheral flange of the first one of the pot parts 3 and the second one of the pot parts 3 of the enclosed chamber 1 is secured and sealed by welding or soldering.

Figure 4:
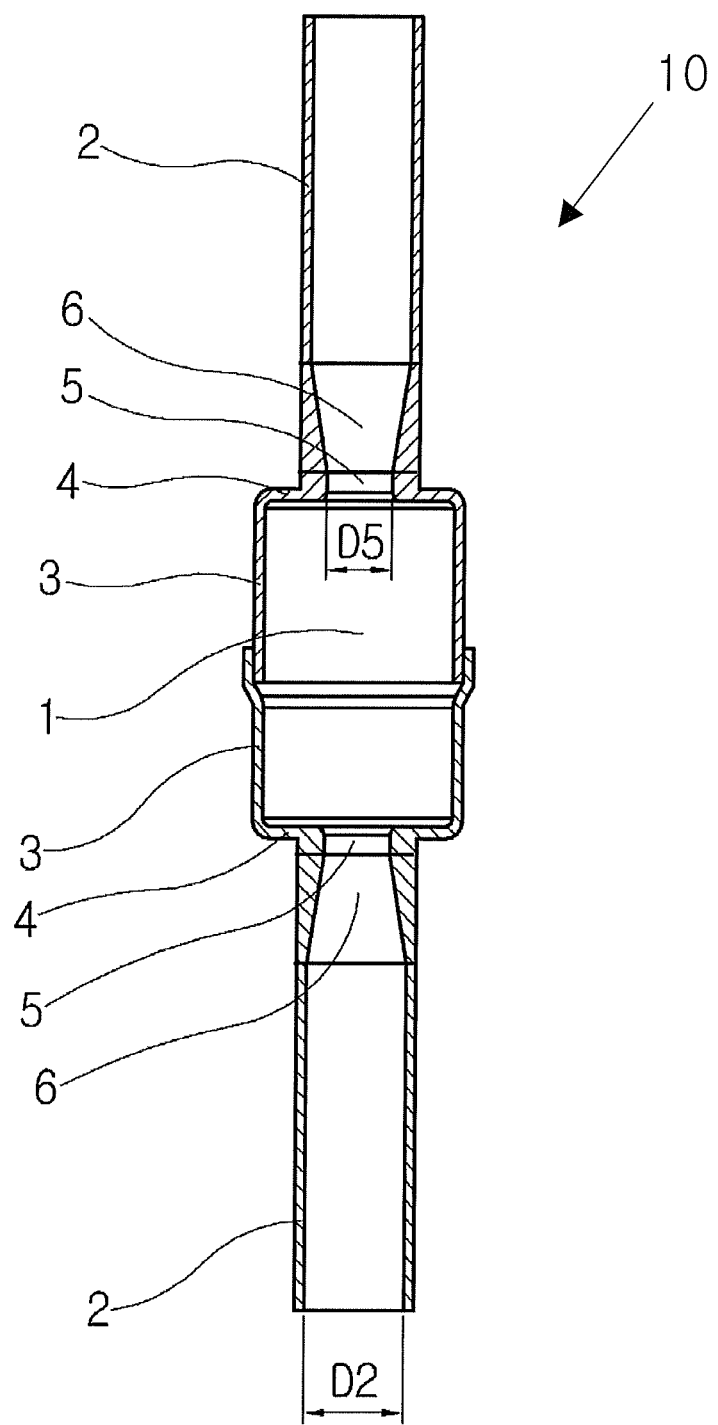
FIG. 4 is a longitudinal, axial cross-sectional view of a variant with inserted, widened section as a separate element.

Apart from the arrangement, where the tapered section 6 is formed as an integral constituent of the air-conditioning conduit 2, an additional variant is possible, wherein the gradually tapered section 6 is formed as a separate part and is secured intermediate the respective ends of the air-conditioning conduit 2 and the pot parts 3, as can be seen in FIG. 4.

Figure 3:
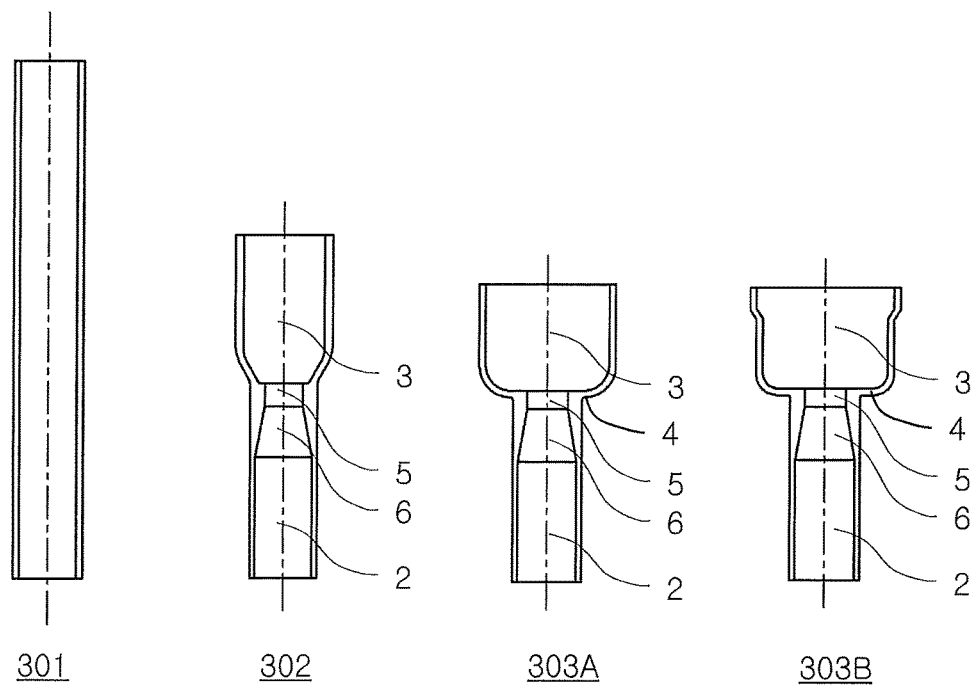
FIG. 3 shows a process of production of one half of the absorbing device of FIG. 1 according to production steps.

A technological process for obtaining the reduction of the inlet and expansion chamber diameters is shown in FIG. 3. In a first step 301, a required section having a required length at each of ends of the cut away conduit 2 is provided. In a second step 302, the tapered portion 6 and the passage 5 of the conduit 2 are formed by ramming to reduce the internal diameter and increase the thickness of the wall to provide a sufficient amount of material for subsequent forming operations, while the original outer diameter of the conduit 2 is still retained.

Further, in a third step 303A, B, one of the ends of the conduit 2 is enlarged up to the final diameter of the pot part 3, while the calibrating of the widening of the internal conduit diameter is being performed at the same time. Then, the end of the conduit 2 is widened until the final diameter is accomplished with the use of a stamping tool. In the third step 303A, B the calibration of the final diameter is performed to obtain desired pot parts 3 of the absorbing device 10.

For a pot part 3 having a peripheral edge flange, the peripheral edge flange may be additionally formed in the third step 303B.

Figure 2:
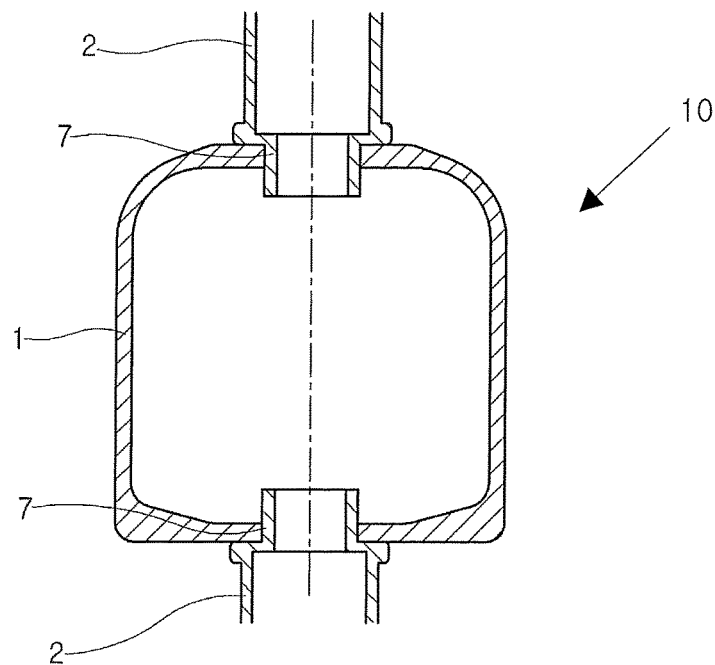
FIG. 2 is a longitudinal, axial cross-sectional view of a second construction variant of the absorbing device.

As can be seen in the FIG. 2, the absorbing device 10 may also include a unitary hollow enclosed chamber 1 disposed between two ends of the air-conditioning conduit 2, wherein the ends of the air-conditioning conduit 2 are secured in an opposing inlet opening and outlet opening of the hollow enclosed chamber 1 with a coaxial mouthpiece 7. An internal diameter of each of the mouthpieces 7 is smaller than an internal diameter of the respective end of the air-conditioning conduit 2.

The invention claimed is:

1. An absorbing device for an air-conditioning system, comprising:
   a first pot part integrally formed in an end of a first air conditioning conduit; and
   a second pot part cooperating with the first pot part to form a hollow enclosed chamber, the second pot part integrally formed in an end of a second air conditioning conduit, an open end of the first pot part connected to an open end of the second pot part, each of the first pot part and the second pot part including a passage therein to provide fluid communication between the hollow enclosed chamber and respective internal spaces of the first air conditioning conduit and the second air conditioning conduit;
   a first tapered section formed between the first air conditioning conduit and the passage of the first pot part, wherein a diameter of the passage of the first pot part is less than a diameter of the internal space of the first air conditioning conduit, wherein a diameter of the first tapered section gradually tapers along a length of the first tapered section from the air conditioning conduit to the passage of the first pot part, and wherein the first air conditioning conduit is spaced from the passage of the first pot part with respect to an axial direction of the passage of the first pot part; and
   a second tapered section formed between the second air conditioning conduit and the passage of the second pot part, wherein a diameter of the passage of the second pot part is less than a diameter of the internal space of the second air conditioning conduit, wherein a diameter of the second tapered section gradually tapers along a length of the second tapered section from the air conditioning conduit to the passage of the second pot part, and wherein the second air conditioning conduit is spaced from the passage of the second pot part with respect to an axial direction of the passage of the second pot part.

2. The absorbing device of claim 1, wherein the first tapered section of the first pot part is formed separate from the first pot part and the first air conditioning conduit.

3. The absorbing device of claim 2, wherein the second tapered section of the second pot part is formed separate from the second pot part and the second air conditioning conduit.

4. The absorbing device of claim 1, wherein the open end of the first pot part is joined to the open end of the second pot part by welding.

5. The absorbing device of claim 1, wherein the open end of the first pot part is joined to the open end of the second pot part by soldering.

6. A method of forming an absorbing device, comprising:
providing a first conduit having an end;
providing a second conduit having an end;
ramming the end of the first conduit to reduce an internal diameter and increase a wall thickness of the end of the first conduit, wherein an outer diameter of the first conduit is retained, wherein the ramming of the end of the first conduit forms a first tapered section; and
ramming the end of the second conduit to reduce an internal diameter and increase a wall thickness of the end of the second conduit, wherein an outer diameter of the second conduit is retained, wherein the ramming of the end of the second conduit forms a second tapered section;
widening a distal portion of the end of the first conduit to form a first pot part having an open end, wherein the first pot part includes a passage therein to provide fluid communication between the first pot part and the first conduit, wherein the first tapered section is formed adjacent the passage of the first pot part, wherein a diameter of the passage of the first pot part is less than the internal diameter of the first conduit, wherein a diameter of the first tapered section gradually tapers along a length of the first tapered section from a portion of the first conduit to the passage of the first pot part, and wherein the portion of the first conduit is spaced from the passage of the first pot part with respect to an axial direction of the passage of the first pot part;
widening a distal portion of the end of the second conduit to form a second pot part having an open end, wherein the second pot part includes a passage therein to provide fluid communication between the second pot part and the second conduit, wherein the second tapered section is formed adjacent the passage of the second pot part, wherein a diameter of the second tapered section gradually tapers along a length of the second tapered section from a portion of the second conduit to the passage of the second pot part, and wherein the portion of the second conduit is spaced from the passage of the second pot part with respect to an axial direction of the passage of the second pot part; and
joining the open end of the first pot part to the open end of the second pot part to form a hollow enclosed chamber.

7. The method of claim 6, further comprising forming a peripheral flange circumscribing the open end of the first pot part.

8. The method of claim 7, wherein the open end of the second pot part is received by the peripheral flange of the first pot part.

9. The method of claim 6, wherein the first pot part is joined to the second pot part by welding.

10. The method of claim 6, wherein the first pot part is joined to the second pot part by soldering.

\* \* \* \* \*